Figure 1:
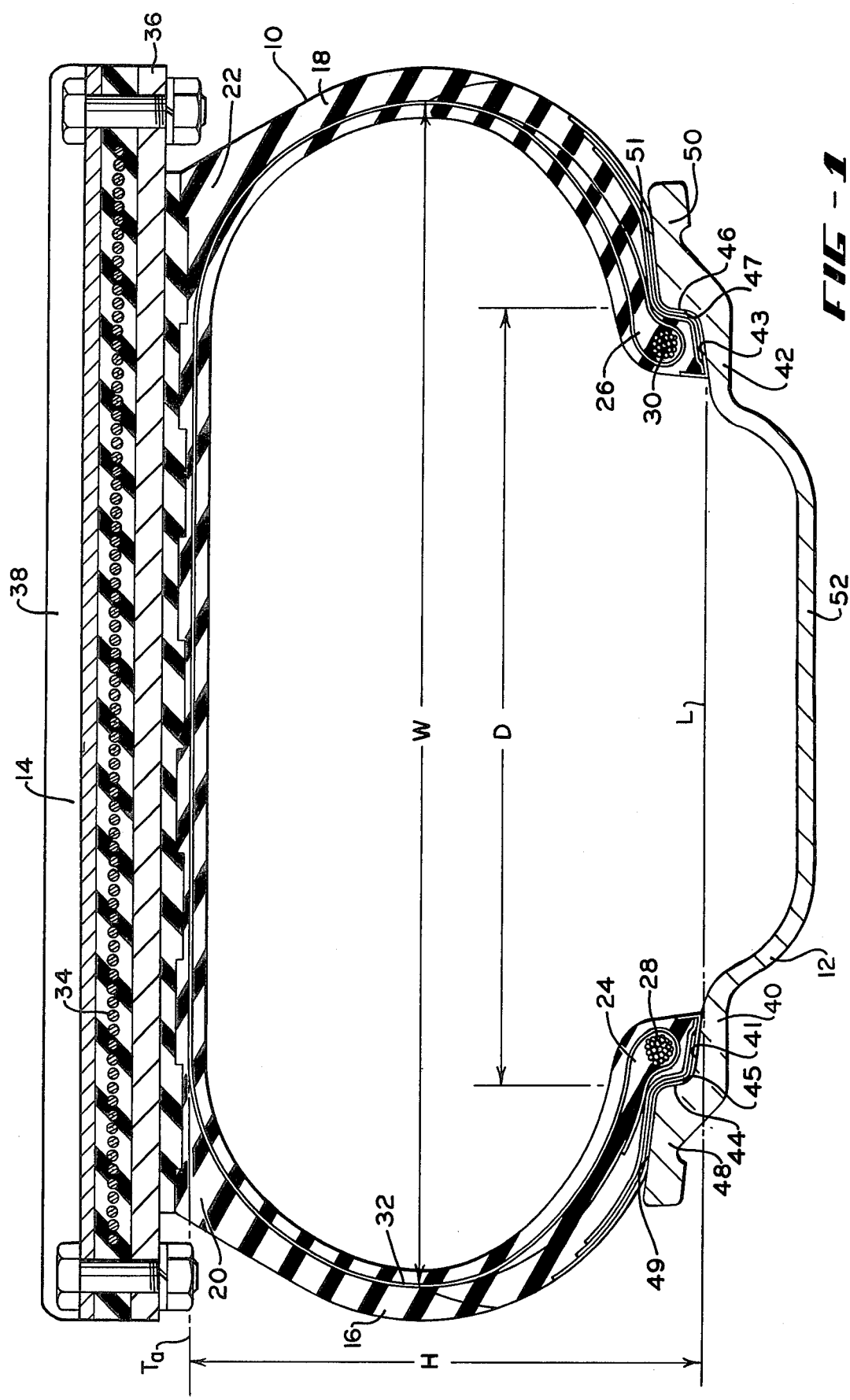

United States Patent [19]

Olsen

[11] 4,096,900
[45] Jun. 27, 1978

[54] EARTHMOVER TIRE AND RIM ASSEMBLY

[75] Inventor: Richard J. Olsen, Massillon, Ohio

[73] Assignee: The Goodyear Tire & Rubber Company, Akron, Ohio

[21] Appl. No.: 646,717

[22] Filed: Jan. 5, 1976

[51] Int. Cl.² .......................... B60C 9/02; B60C 15/00
[52] U.S. Cl. ............................ 152/354 R; 152/362 R
[58] Field of Search ............ 152/362 R, 362 CS, 379, 152/381, 354–359, 330 RF; 301/97, 98; 305/19

[56] References Cited

U.S. PATENT DOCUMENTS

| 3,486,547 | 12/1969 | Powers | 152/330 RF |
| 3,568,750 | 3/1971 | Henning | 152/354 |
| 3,631,913 | 1/1972 | Boileau | 152/362 R |
| 3,760,858 | 9/1973 | Grossett | 152/361 |
| 3,910,336 | 10/1975 | Boileau | 152/354 |
| 3,951,192 | 4/1976 | Gardner et al. | 152/362 CS X |

Primary Examiner—Robert B. Reeves
Assistant Examiner—Francis J. Bartuska
Attorney, Agent, or Firm—R. P. Yaist

[57] ABSTRACT

A radial ply tire and rim assembly for use on earthmoving equipment. The rim is of the drop center type having approximately six degree bead seats and an extended conical stabilizer flange. The tire when mounted on the rim and inflated has its carcass distorted radially outwardly from the natural equilibrium curvature in which it was molded.

The foregoing abstract is not be taken as limiting the invention of this application, and in order to understand the full nature and extent of the technical disclosure of this application, reference must be made to the accompanying drawings and the following detailed description.

10 Claims, 2 Drawing Figures

EARTHMOVER TIRE AND RIM ASSEMBLY

This invention relates to pneumatic tires and more particularly to a radial ply tire and rim assembly having particular utility on earthmovers.

Earthmover tires have normally been mounted on rims which can be disassembled. These rims are either of the split rim type or of the type having a demountable flange. Although the simplicity of mounting earthmover tires on a rim of the drop center type has been known it has generally been avoided because the size and rigidity of the bead portions are so great it was generally considered to be impractical. Recently earthmover tires have been mounted on drop center rims. However, the rims were provided with very shallow flanges to permit the button-holing of the tire onto the rim and 15° tapered bead seats were provided. The bead portions of the tire, therefore, were wedged very tightly on the bead seat. This wedging action on a 15° tapered bead seat causes undesirably high stresses in the rim.

The present invention overcomes this difficulty by providing a special bead area configuration in the tire and a conical stabilizer flange for engagement with the bead area to enhance torque transmissability. The taper of the bead seats is reduced at least to eight degrees with respect to the rotational axis of the tire. A low profile radial ply tire is mounted on a special rim having a narrow bead spacing and a pair of axially extending stabilizer flanges. Each axially extending flange is designed to distort the carcass from its natural equilibrium curvature without causing any reversal of curvature in the carcass structure. Each stabilizer flange extends in axial directions over a distance at least equal to 10 percent of the maximum axial width of the inflated tire. The carcass ply, as it approaches each bead core curves axially inwardly to form a large angle with respect to a plane tangent to the axially outer surface of the bead core.

Other objects will be in part apparent and in part pointed out more in detail hereinafter.

The invention accordingly consists in the features of construction, combination of elements and arrangement of parts which will be exemplified in the construction hereinafter set forth and the scope of the application of which will be indicated in the appended claims.

Figure 2:
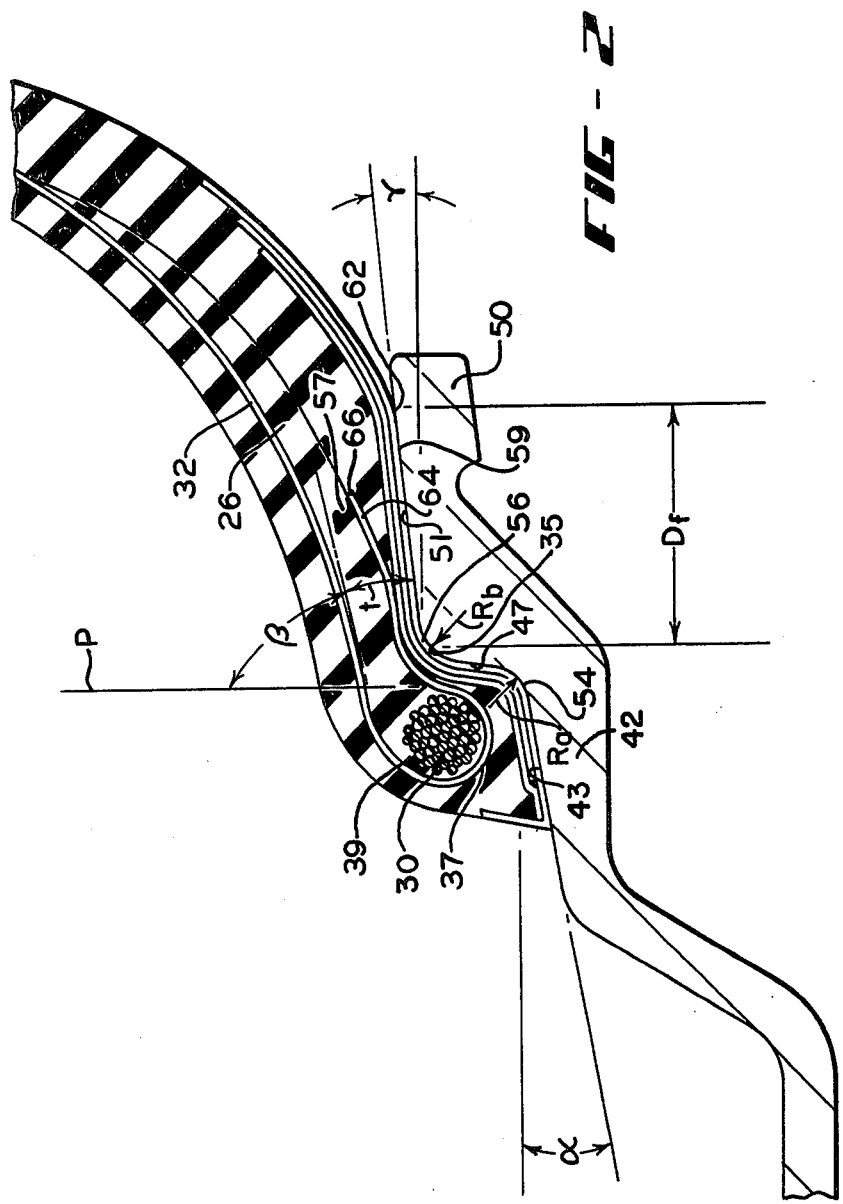

In the drawings:

FIG. 1 is a cross-sectional view of a tire and rim assembly made in accordance with the present invention; and FIG. 2 is an enlarged view of the flange and bead area of the tire of FIG. 1.

With reference to the drawings and in particular FIG. 1, there is illustrated a tire 10 mounted on a rim 12 and inflated to design inflation pressure. For purposes of this invention, design inflation pressure shall be considered the average of the maximum and minimum design inflation pressures.

The tire 10 includes a circumferentially extending tread portion 14 and a pair of sidewall portions 16,18 extending radially inwardly from the tread portion 14. The sidewall portions 16 and 18 curve axially inwardly toward each other at their radially inner ends and terminate in a pair of bead portions 24,26. Each bead portion 24,26 includes a circumferentially extending inextensible bead core 28,30. A carcass structure 32 having its cords lying in planes containing the rotational axis of the tire extends circumferentially about the tire 10 and from bead core 28 to bead core 30.

For purposes of this invention, the dimensions and proportions of the tire are determined when the tire is inflated to design inflation pressure and in a static, unloaded condition as illustrated in FIG. 1. The section height H of the tire 10 is the radial distance from the bead base line L to a tangent $T_a$ to the radially outermost extremity of the carcass structure 32. The section width W is the axial distance between the axially outermost extremities of the carcass structure 32. A tire 10 made in accordance with the present invention has an aspect ratio (H/W) which is no greater than 0.75 or 75 percent and preferably from about 40 to about 60 percent.

Although one carcass ply is illustrated, any suitable number of carcass plies could be utilized. Further, for purposes of this invention, a radial ply tire shall be construed to include pneumatic tires in which all of the cords in the sidewall extend at angles no greater than 15° with respect to planes containing the rotational axis of the tire over a radial extent of the sidewall equal to at least 50 percent of the section height H of the tire.

In the embodiment illustrated the tread portion comprises a replaceable track belt having a circumferential extending ply 34 of helically wound cords disposed radially outwardly of a plurality of axially extending keeper bars 36. The keeper bars are bolted at their axially outer ends to a plurality of grousers 38 to fix the grousers on the track belt. Although, in the particular embodiment illustrated, one belt ply 34 is illustrated, it will be appreciated that any number of belt plies suitable for the specific application may be utilized. The cords in the belt plies may extend parallel to the circumferential centerline of the tire or they may extend at any suitable bias angle with respect to the circumferential centerline. Further, it will be appreciated that the tire 10 could be provided with an integral tread structure or a replaceable tread structure.

Further, it will be appreciated that any material suitable for the particular application may be utilized for the carcass structure 32 and the belt structure 34, such as, by way of example only, nylon, rayon, polyester, fiberglass, steel, or aramid.

The rim 12 includes a pair of conical or tapered bead seats 40 and 42 having a bead seat surface 41 and 43, respectively. A pair of bead registers 44 and 46 each having a bead register surface 45 and 47, respectively, extend radially outwardly from the respective axially outer edges of the bead seats 40 and 42. A pair of annular stabilizer flanges 48 and 50, respectively, extend axially outwardly of and from the radially outer extremities of the respective bead registers 44 and 46. The rim 12 includes a drop center well 52 to facilitate mounting the tire 10 on the rim 12. The axial distance D between the bead seat surfaces 41 and 43 is no greater than 65 percent of the section width W of the carcass structure 32.

More particularly and with reference to FIG. 2, there is illustrated an enlarged view of the bead portion 26 of the tire 10 of FIG. 1. Only one bead portion 26 will be described herein, it being understood that both bead portions 24 and 26 are similar. For purposes of clarity, the same numerals used in FIG. 1 will be used for corresponding parts in FIG. 2. The bead seat 42 as noted above is generally conical and may have its bead seat surface 43 extending at an angle alpha ($\alpha$) with respect to the rotational axis of the tire of up to 8°. The bead seat surface 43 merges with the bead register surface 47 through a curved portion 54. The bead register surface 47 merges with the flange surface 51 through another curved portion 56. For purposes of this invention the bead register surface 47 shall extend between the radius $R_a$ of the curved portion 54 to the radius $R_b$ of the curved portion 56 with both the radius $R_a$ and the radius $R_b$ extending at an angle of 45 degrees with respect to the rotational axis of the tire 10.

The bead register surface 47 extends to a point 35 which is at least 30 percent of the distance from the radially inner surface 37 of the bead core 30 to the radially outer surface 39 of the bead core 30, but no further than the radially outer surface. The contact surface 51 of the flange 50 extends in axial directions for a distance $D_f$ equal to at least 10 percent of the section width W of the carcass structure 32.

The carcass structure 32 is wrapped around the bead core 30 and has its end portion 64 lying adjacent the main portion of the carcass structure 32. The turned-up portion 64 terminates at a point 66 which is axially inwardly of the initial contact point 62 in the sidewall.

Further, as seen in FIG. 2, the carcass structure 32 approaches the bead core 30 at a very large angle $\beta$ with respect to the plane P that is tangent to the axially outer surface of the bead core 30. This angle $\beta$ is substantially greater than 45° but no more than 90°. For most applications $\beta$ should be at least 60°.

More particularly, in accordance with the present invention, the stabilizer flange 50 has its flange engaging surface 51 extending at a very small angle gamma ($\nu$) with respect to the rotational axis of the tire. Preferably gamma ($\nu$) should be no greater than 10° and in any event should be less than the angle beta ($\beta$). In order to provide the desired compression between the stabilizer flange 50 and the bead portion 26, the bead portion 26 is provided with a unique molded contour such that when the tire 10 is mounted on the rim 12 and inflated, the bead portion is compressed against the stabilizer flange 50. Conversely, the stabilizer flange 50 distorts the carcass structure 32 radially outwardly. This unique contour is accomplished by providing a unique configuration of the elastomeric material 57 between the carcass structure 32 and the outer surface 59 of the bead portion 26. This elastomeric material shall be construed to include all chaffers, chippers, turn-up plies, etc. which may be disposed between the contact surface 59 and the carcass structure 32. The thickness t of the tire measured between the carcass structure 32 and the contact surface 59 is a minimum adjacent the curved portion 56 of the rim 12 and increases to a maximum at the initial contact point 62 with the rim. The thickness t is measured perpendicularly with respect to the carcass structure 32.

The unique composite design of the lower bead portion of the tire and the rim structure permits the mounting of large earthmover tires on a drop center rim without attendant disadvantages caused by the use of 15° tapered bead seats. Because the conical stabilizer flange extends at a small angle with respect to the axis of the tire, it can extend quite far in axial directions without extending too far in radial directions. This reduces the need for bulky apex strips adjacent to the bead cores, enhances torque transmissability and still permits the mounting of the tire on a drop center rim. The unique contour of the lower sidewall area permits pre-loading of the carcass structure on the stabilizer flange which also enhances torque transmissability.

The tire according to the present invention may be built in a normal fashion by assembling the various components on a tire building form. The tire can then be shaped and cured in a mold under heat and pressure.

The neutral contour line of a carcass ply is the center line of a wire or cord in the carcass ply as viewed in planes containing the rotational axis of the tire. If more than one carcass ply is present the neutral contour line shall be the center line of the composite of the carcass plies as viewed in planes containing the rotational axis of the tire.

The tire 10 is maintained during vulcanization in a configuration in which the neutral contour line of the carcass structure 32 follows the natural equilibrium curvature at least from the plane P tangent to the axially outer edges of the respective bead core substantially to the respective shoulder portion of the tire. The natural equilibrium curvature of tires is well known and defined in the art and thus will not be discusssed in detail herein. See for example, Chapter II, *Mathematics Underlying the Design of Pneumatic Tires,* John F. Purdy, and *Theory For the Meridian Section of Inflated Cord Tire,* by R. B. Day and S. D. Gehman, Rubber Chemistry and Technology, Volume XXXVI, No. 1, P; 11-27, January - March 1963, both of which are incorporated herein by reference.

The tire after curing is mounted on a specifically designed rim which causes the neutral contour line of the carcass structure 32 to deviate from the natural equilibrium curvature and thus provide a preloading on the axially extending flanges. The flanges, therefore, force the neutral contour line of the carcass structure radially outwardly from the natural equilibrium curvature at least from a point just axially outwardly of the plane P at least to the point of maximum axial width of the tire.

While certain representative embodiments and details have been shown for the purpose of illustrating the invention, it will be apparent to those skilled in the art that various changes and modifications may be made therein without departing from the spirit or scope of the invention.

What is claimed is:

1. A tire and rim assembly for use on earthmovers in which (A) the tire comprises a tread portion, a pair of sidewall portions, a pair of annular bead portions and a carcass structure extending circumferentially around said tire and from one bead portion to the other bead portion, each said bead portion having an annular inextensible bead core, a bead seat surface disposed radially inwardly of the annular bead core, a bead register surface extending radially outwardly of the axially outer edge of the bead seat surface and a flange contact surface extending axially outwardly of the radially outer end of the bead register surface, (B) the rim is of the drop center type and having a bead seat in engagement with the bead seat surface of the tire, a flange register in contact with the flange register surface of the tire and a stabilizer flange being substantially straight throughout its axial extent and disposed at an angle of less than 10° with respect to the rotational axis of the tire and extending axially outward of the radially outer edge of the bead register for a distance equal to at least 10% of the maximum axial width of said tire when mounted on the rim and inflated, (C) said assembly being characterized by the flange contact surface of the tire being in contact with the stabilizer flange for a distance equal to at least 10% of the section width of the carcass structure and the distance between the contact surface of the flange and the carcass structure decreasing from a maximum at the axially outer extremity of the contact surface to a minimum adjacent the bead register surface to provide a preloading on said flange when said tire is inflated.

2. A tire and rim assembly as claimed in claim 1 wherein said bead seat surface as viewed in planes containing the rotational axis of a tire extends at an angle of no greater than 8° with respect to the rotational axis of the tire.

3. A tire and rim assembly as claimed in claim 1 wherein the flange contact surface as viewed in planes containing the rotational axis of the tire is substantially straight throughout the entire axial length thereof and extends at an angle of no greater than 10° with respect to the rotational axis of the tire.

4. A tire and rim assembly as claimed in claim 3 wherein the bead register extends in radial directions at least to the mid-height of the adjacent bead core of the tire but no farther than the radially outer extremity of said bead core.

5. A tire and rim assembly as claimed in claim 4 wherein the axial spacing between the beads is no greater than 65 percent of the maximum axial width of the tire.

6. A tire and rim assembly as claimed in claim 2 wherein said tire includes a carcass structure of continuous cords and said cords extend from bead to bead and at an angle of no greater than 15° with respect to planes containing the rotational axis of the tire over a radial extent of the sidewall equal to at least 50 percent of the section height of the tire.

7. A tire and rim assembly as claimed in claim 6 wherein the flange contact surface as viewed in planes containing the rotational axis of the tire is substantially straight throughout the entire axial length thereof and extends at an angle of no greater than 10° with respect to the rotational axis of the tire.

8. A tire and rim assembly as claimed in claim 7 wherein the axial extent of the flange contact surface is equal to at least 10 percent of the maximum axial width of said tire when mounted on the rim and inflated.

9. A tire and rim assembly as claimed in claim 8 wherein the axial spacing between the beads is no greater than 65 percent of the maximum axial width of the tire.

10. A tire and rim assembly as claimed in claim 9 wherein the bead register extends in radial directions at least to the mid-height of the adjacent bead core of the tire but no farther than the radially outer extremity of said bead core.

* * * * *